United States Patent
Benicewicz et al.

(10) Patent No.: US 9,598,541 B2
(45) Date of Patent: Mar. 21, 2017

(54) METHOD OF MAKING POLYBENZIMIDAZOLE

(71) Applicant: PBI Performance Products, Inc., Charlotte, NC (US)

(72) Inventors: Brian C. Benicewicz, Columbia, SC (US); Alexander Lanier Gulledge, Columbia, SC (US); Warren P. Steckle, Jr., West Columbia, SC (US); Gregory S. Copeland, Tega Cay, SC (US); Bobby G. Dawkins, Charlotte, NC (US)

(73) Assignee: PBI Performance Products, Inc., Charlotte, NC (US)

( * ) Notice: Subject to any disclaimer, the term of this patent is extended or adjusted under 35 U.S.C. 154(b) by 15 days.

(21) Appl. No.: 14/293,211

(22) Filed: Jun. 2, 2014

(65) Prior Publication Data

US 2014/0357831 A1    Dec. 4, 2014

Related U.S. Application Data

(60) Provisional application No. 61/830,869, filed on Jun. 4, 2013.

(51) Int. Cl.
*C08G 73/18* (2006.01)
*C08J 5/18* (2006.01)
*D01F 6/74* (2006.01)

(52) U.S. Cl.
CPC ............. *C08G 73/18* (2013.01); *C08J 5/18* (2013.01); *D01F 6/74* (2013.01); *C08J 2379/04* (2013.01)

(58) Field of Classification Search
CPC .......... C08G 73/18; C08J 5/18; C08J 2379/04
See application file for complete search history.

(56) References Cited

U.S. PATENT DOCUMENTS

| | | | |
|---|---|---|---|
| RE26,065 E | 7/1966 | Marvel et al. | |
| 3,433,772 A | 3/1969 | Chenevey et al. | |
| 3,509,108 A | 4/1970 | Prince | |
| 3,551,389 A | 12/1970 | Prince | |
| 3,630,972 A | 12/1971 | Marvel et al. | |
| 3,655,632 A | 4/1972 | Ohfuji et al. | |
| 3,763,107 A * | 10/1973 | D'Aledio | 528/38 |
| 4,312,976 A | 1/1982 | Choe | |
| 4,672,104 A | 6/1987 | Ward | |
| 4,717,764 A | 1/1988 | Ward | |
| 7,696,302 B2 | 4/2010 | Calundann et al. | |
| 2007/0010646 A1 | 1/2007 | Dawkins et al. | |
| 2013/0052375 A1 | 2/2013 | Wu | |

OTHER PUBLICATIONS

Cook, "Synthesis of polybenzimidazoles containing arylene sulfone and ether linkages", Master's Thesis, Oregon State University, 1993, pp. 14-16.*

Diana Lynn Cook, "Synthesis of plybenzimidazoles containing arylene sulfone and ether linkages", Master's Thesis, Oregon State University, 1993, pp. 14-16.

E.J. Powers et al., "History and Development of Polymenziniidazole," Symposium on the History of High Performance Polymers—Apr. 15-18, 1986, American Chemical Society, New York.

D.N. Gray et al., "Poly-2,2'-(1,4-Phenylene)-5,5'-Bibenzimidazole From 3.3',4,4'-Tetraaminobiphenyl and 1.4-Diacetylbenzene," ACS Polymer Reprints, American Chemical Society, (vol. 8), (Issue. 2), (p. 1138-1148), (1967).

C.D. Dudgeon et al., "Bisorthoesters as Polymer Intermediates. II. A Facile Method for the Preparation of Polybenzimidazoles," Journal of Polymer Science: Polymer Chemistry Edition, John Wiley & Sons, Inc., (vol. 16), (p. 1831-1852), (1978).

J. Higgins et al., "Benzimidazole Polymers from Aldehydes and Tetraamines," Journal of Polymer Science: Part A-1, John Wiley & Sons, Inc., (vol. 8), (p. 171-177), (1978).

J. Mader et al., "Polybenzimidazole/Acid Complexes as High-Temperature Membranes," Adv Polym Sci, Springer-Verlag Berlin Heidelberg, (vol. 216), (p. 63-124), (2008).

G. Qian et al., "Synthesis and Characterization of High Molecular Weight Hexafluoroisopropylidene-Containing Polybenzimidazole for High-Temperature Polymer Electrolyte Membrane Fuel Cells," Journal of Polymer Science: Part A: Polymer Chemistry, Wiley Periodicals, Inc., (vol. 47), (p. 4064-4073), (2009).

F.L. Hedberg et al., "A New Single-Step Process for Polybenzimidazole Synthesis," Journal of Polymer Science: Polymer Chemistry Edition, John Wiley & Sons, Inc., (vol. 12), (p. 1823-1828), (1974).

* cited by examiner

*Primary Examiner* — Kuo-Liang Peng
(74) *Attorney, Agent, or Firm* — Hammer & Associates, P.C.

(57) ABSTRACT

A method of making a polybenzimidazole (PBI) includes the steps of: reacting, in a solution, an organic compound having at least 2 amino groups with an organic aldehyde adduct, the reactants comprise at least 8% by weight of the solution. A solvent of the solution may be selected from the group of: N,N-dimethylacetamide (DMAc), N,N-dimethylformamide (DMF), dimethylsulfoxide (DMSO), N-methyl-2-pyrrolidone (NMP), tetramethylene sulfone, and combinations thereof. The organic aldehyde adduct may be an organic aldehyde bisulfite adduct. The organic aldehyde portion of the organic aldehyde adduct being aliphatic, alicyclic, aromatic, heterocyclic, or heteroaromatic aldehyde or mixtures thereof. The polybenzimidazole may have an intrinsic viscosity of at least 0.40 dl/g.

6 Claims, 4 Drawing Sheets

METHOD OF MAKING POLYBENZIMIDAZOLE

RELATED APPLICATION

This application claims the benefit of U.S. provisional patent application Ser. No. 61/830,869 filed Jun. 4, 2013, incorporated herein by reference.

FIELD OF THE INVENTION

The instant invention is directed to a process for making polybenzimidazole.

BACKGROUND OF THE INVENTION

Polybenzimidazoles (PBI) are a known class of compounds, see the discussion below. Also see: Powers, E. J. and Serad, G. A., *History and Development of Polybenzimidazole*, Symposium on the History of High Performance Polymers, American Chemical Society (1986). PBI may be made by either a melt/solid polymerization or a solution polymerization. To date, the most prominent commercial process for the manufacture of PBI has been the melt/solid polymerization.

The melt/solid polymerization generally is performed in two steps. See, for example, U.S. Pat. Nos. Re. 26,065; 3,433,772; 3,509,108; 3,551,389; 3,655,632; 4,312,976; 4,717,764; & 7,696,302 each is incorporated herein by reference. The first step is the reaction of the monomers, and the second step increases the molecular weight of the polymer. The polymer typically requires an inherent viscosity (IV), measured in sulfuric acid, of greater than 0.4 dl/g (typically 0.50-1.20). This polymer, or resin, may be subsequently formed into, among other things, fibers and films. The process for forming fibers and films requires the production of a dope (about 25% by weight polymer in solvent for fiber spinning operations, about 15% for film casting operations, about 10% for hand casting of films), and extrusion of the dope into either the fiber or film with the evolution of the solvent. While this process has produced a PBI that has met with great commercial success, the cost of producing the polymer has been limiting in the wide industrial acceptance of the polymer.

Solution polymerization is also known, see Powers and Serad, mentioned above, page 2. However, the solution polymerization method has been nothing more than an academic novelty. A significant problem is that solution polymerization has been conducted at low monomer concentrations. Another problem is that as the monomer concentration in the solution increases, the polymer's IV decreases. See for example, Mader, J. et al., Polybenzimidazole/Acid Complexes as High-Temperature Membranes, *Adv Polym Sci* (2008) 216: 63-124, page 103, FIG. 14 (reproduced here as FIG. 1). Because the solution method has not produced polymer with a sufficiently high IV or a solution with a sufficiently high solids content, this method has not been exploited commercially.

There is a need for a method of making a polybenzimidazole having a sufficiently high IV and a high solids content in solution.

DESCRIPTION OF THE DRAWINGS

For the purpose of illustrating the invention, there is shown in the drawings a form that is presently preferred; it being understood, however, that this invention is not limited to the precise arrangements and instrumentalities shown.

SUMMARY OF THE INVENTION

A method of making a polybenzimidazole (PBI) includes the steps of: reacting, in a solution, an organic compound having at least 2 amino groups with an organic aldehyde adduct, the reactants comprise at least 8% by weight of the solution. A solvent of the solution may be selected from the group of: N,N-dimethylacetamide (DMAc), N,N-dimethylformamide (DMF), dimethylsulfoxide (DMSO), N-methyl-2-pyrrolidone (NMP), tetramethylene sulfone, and combinations thereof. The organic aldehyde adduct may be an organic aldehyde bisulfite adduct. The organic aldehyde portion of the organic aldehyde adduct being aliphatic, alicyclic, aromatic, heterocyclic, or heteroaromatic aldehyde or mixtures thereof. The polybenzimidazole may have an intrinsic viscosity of at least 0.40 dl/g.

DESCRIPTION OF THE INVENTION

Polybenzimidazoles (PBI) are a known class of compounds. See, for example, US Re26065; U.S. Pat. Nos. 3,433,772; 4,717,764; and 7,696,302, each of which is incorporated herein by reference. Examples of polybenzimidazoles include: poly-2,2'-(m-phenylene)-5,5'-bibenzimidazole; poly-2,2'-(biphenylene-2"2'")-5,5'-bibenzimidazole; poly-2,2'-(biphenylene-4"4'")-5,5'-bibenzimidazole; poly-2,2'-(1",1",3"trimethylindanylene)-3"5"-p-phenylene-5,5'-bibenzimidazole; 2,2'-(m-phenylene)-5,5'-bibenzimidazole/2,2-(1",1",3"-trimethylindanylene)-5",3"-(p-phenylene)-5,5'-bibenzimidazole copolymer; 2,2'-(m-phenylene)-5,5-bibenzimidazole-2,2'-biphenylene-2",2'"-5,5'-bibenzimidazole copolymer; poly-2,2'-(furylene-2",5")-5,5'-bibenzimidazole; poly-2,2'-(naphthalene-1",6")-5,5'-bibenzimidazole; poly-2,2'-(naphthalene-2",6")-5,5'-bibenzimidazole; poly-2,2'-amylene-5,5'-bibenzimidazole; poly-2,2'-octamethylene-5,5'-bibenzimidazole; poly-2,2'-(m-phenylene)-diimidazobenzene; poly-2,2'-cyclohexenyl-5,5'-bibenzimidazole; poly-2,2'-(m-phenylene)-5,5'-di(benzimidazole)ether; poly-2,2'-(m-phenylene)-5,5'-di(benzimidazole)sulfide; poly-2,2'-(m-phenylene)-5,5'-di(benzimidazole)sulfone; poly-2,2'-(m-phenylene)-5,5'-di(benzimidazole)methane; poly-2,2"-(m-phenylene)-5,5"-di(benzimidazole)propane-2,2; and poly-ethylene-1,2-2,2"-(m-phenylene)-5,5"-dibenzimidazole)ethylene-1,2 where the double bonds of the ethylene groups are intact in the final polymer. Poly-2,2'-(m-phenylene)-5,5'-bibenzimidazole is preferred.

Figure 1:
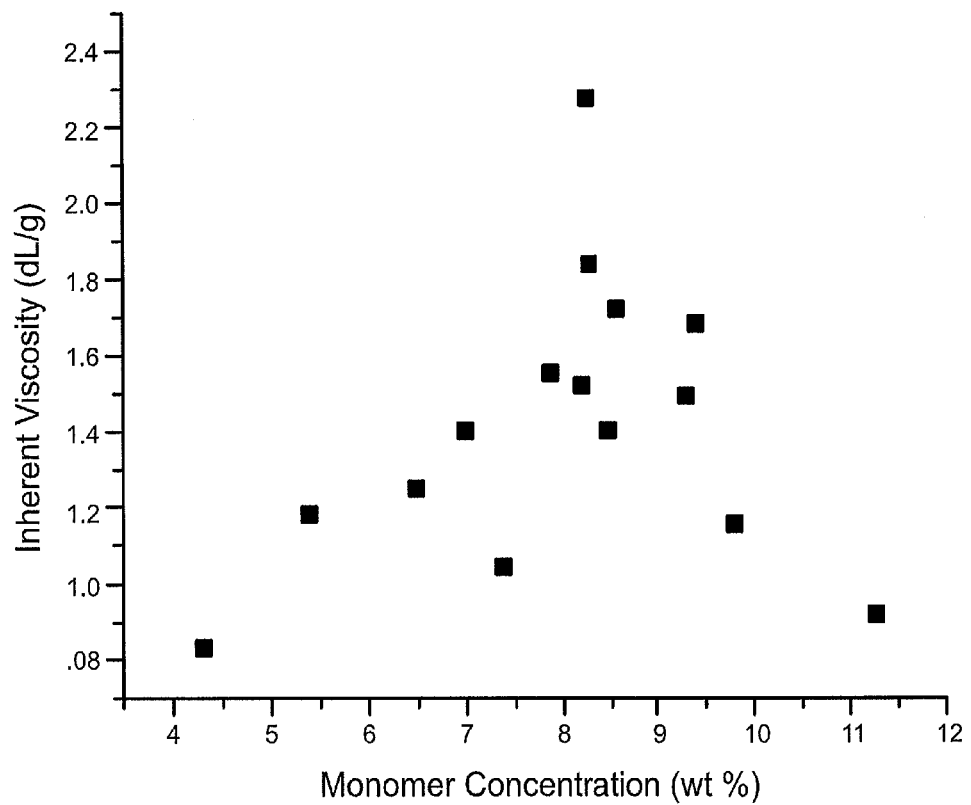
FIG. 1 is a graph (Prior Art) showing that a monomer concentration, in the solution, increases, the polymer's intrinsic viscosity (IV) decreases.
Figure 2:
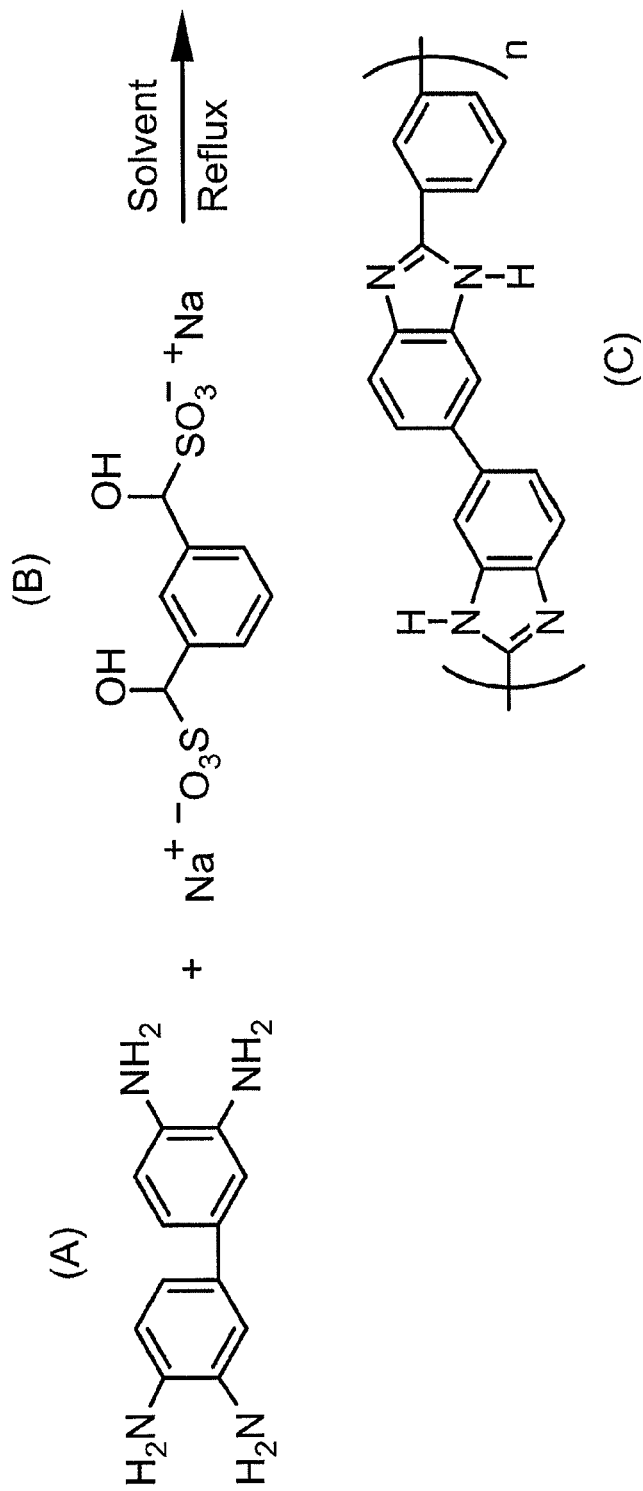
FIG. 2 is a schematic illustration of an embodiment of the instant invention.

FIG. 2 is a schematic illustration of the reaction of one embodiment of the instant invention. Generally, FIG. 2 illustrates an organic compound (A) reacted, in solution, with an adduct (B) to obtain a product (C). More specifically, FIG. 2 illustrates an organic compound having at least 2 amino groups (A) reacted, in solution, with an organic aldehyde adduct (B) to obtain a polybenzimidiazole (C). In one embodiment, it may be beneficial to add an excess of the salt used to form the adduct (discussed below) to the reaction mixture (this may be used as a measure to support conversion of any traces of free aldehyde to the adduct).

In general, the method (reaction) is a solution polymerization where the reactants (or monomers) comprise at least 8% by weight of the solution. Preferably, the reactants may comprise at least 10%, or at least 15%, or at least 20%, or at least 25%, or up to 40%, or in a range of 20-30%, or in a range of 20-35% by weight of the solution (and subsets thereof).

Figure 3:
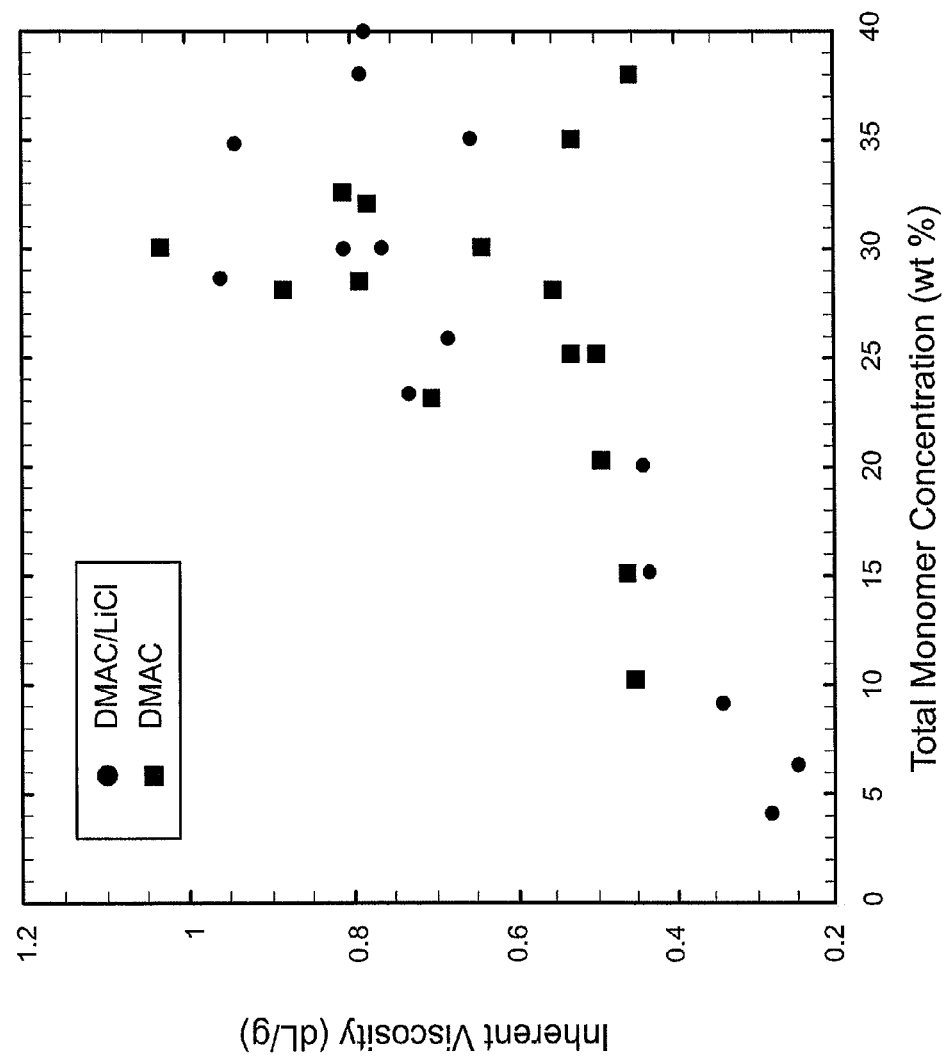
FIG. 3 is a graph showing polymer IV as a function of monomer concentration in the solution (invention).

By such reaction, one obtains the surprising result that increasing solids content in the polymerization yields increasing IVs. This is illustrated in FIG. 3. The resulting PBI may have an IV, measured in sulfuric acid (method set out below), of at least 0.4 dl/g, or at least 0.5 dl/g, or at least 0.7 dl/g, or at least 1.0 dl/g, or at least 1.20 dl/g (and subsets thereof).

The reaction conditions may be at any pressure and any temperatures. Excessive pressures and temperatures are not necessary to advance the reaction. Temperatures may range from 100° C. to 285° C. In one embodiment, the temperature is from 150° C. to 200° C., and the pressure is atmospheric.

The solvents for the solution polymerization may include any solvent for the reactants and polymer. Solvents may include N,N-dimethylacetamide (DMAc), N,N-dimethylformamide (DMF), dimethylsulfoxide (DMSO), N-methyl-2-pyrrolidone (NMP), tetramethylene sulfone, and combinations thereof. In one embodiment, the solvent may be N,N-dimethylacetamide (DMAc).

The solvents may optionally contain a salt to help extend the shelf life of the solution. Such a salt may be lithium chloride, calcium chloride, and combinations thereof. The salt may be present in a range of up to 10%. In one embodiment, the salt may be about 2-4% by weight of the solution. In another embodiment, the salt may be lithium chloride at about 2-4% by weight of the solution.

The reactants may be: 1) an organic compound having at least 2 amino groups, preferably at least 4 amino groups, and most preferably 4 amino groups; and 2) an organic aldehyde adduct.

The organic compound having the amino groups may be any organic compound having the specified number of amino groups. Those organic compounds may be selected from the group of aliphatic, alicyclic, aromatic, heterocyclic, or heteroaromatic compounds and mixtures thereof. The aromatic and heteroaromatic tetra-amino compounds may include, for example, 3,3',4,4'-tetra-aminobiphenyl, 2,3,5,6-tetra-aminopyridine, 1,2,4,5-tetra-aminobenzene, 3,3',4,4'-tetra-aminodiphenylsulfone, 3,3',4,4'-tetra-aminodiphenyl ether, 3,3',4,4'-tetra-aminobenzophenone, 3,3',4,4'-tetra-aminodiphenyl methane, and 3,3',4,4'-tetra-aminodiphenyldimethylmethane. In one embodiment, the organic compound is tetraaminobenzene. In a preferred embodiment, the organic compound is a tetraamino biphenyl (TAB).

Figure 4:
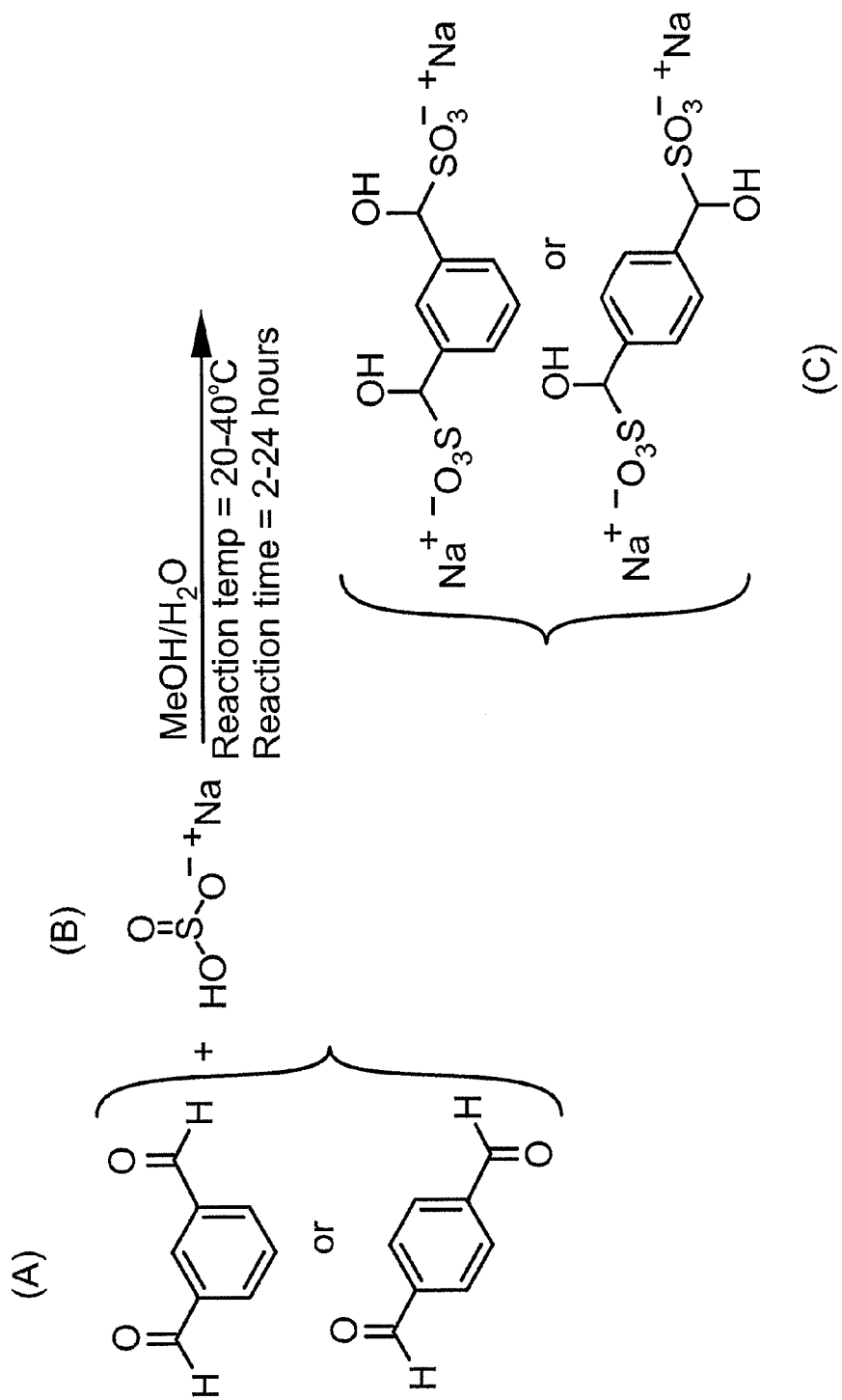
FIG. 4 is a schematic illustration of a synthesis of the adducts that may be used in the instant invention.

The organic aldehyde adduct may be any organic aldehyde adduct. In FIG. 4, there is a schematic illustration of the production of two such adducts. Generally, an aldehyde (A) reacts with a bisulfite (B) to obtain the organic aldehyde adduct (C). This reaction is conducted in an aqueous solution of alcohol (e.g., methanol) at a temperature in the range of about 20-40° C. for a period of about 2-24 hours. In one embodiment, the organic aldehyde adduct is an organic aldehyde bisulfite. Bisulfite salts used in making the organic aldehyde adduct may include metal salts such as sodium bisulfite or potassium bisulfite, sodium metabisulfite, potassium metabisulfite or non-metal salts such as ammonium sulfite and ammonium metabisulfite. In another embodiment, the organic aldehyde adduct is an organic aldehyde bis(bisulfite). The organic aldehyde portion of the organic aldehyde adduct may be any organic aldehyde. Those organic aldehydes may be selected from the group of aliphatic, alicyclic, aromatic, heterocyclic, or heteroaromatic compounds and mixtures thereof. In one embodiment, the organic aldehyde is terephthaldehyde. In another embodiment, the organic aldehyde is isophthalaldehyde.

Upon completion of the solution polymerization, the polymer may be removed from the solvent for use in resin form (e.g., powder or pellets) or may be ready for extrusion into a form of, for example, a fiber or a film.

For thermoplastic molding applications, the polymer should have an IV of at least 0.40 dl/g upon isolation from solution, or in the range of 0.40-0.60 dl/g, or in the range of 0.45-0.55 dl/g (and subsets thereof). For polymer in solution to be extruded as fiber, the IV should be at least 0.50 dl/g, or 0.60-0.80 dl/g, and or 0.68-0.76 dl/g (and subsets thereof). For fiber spinning, the polymer weight % solids in the solution may be greater than 15%, or 20-35%, or 25-30% (and subsets thereof). For film formation by any means, the polymer IV in solution should be at least 0.80 dl/g, or greater than 1.00 dl/g, or greater than 1.10 dl/g (and subsets thereof). For film formation, the polymer weight % solids in solution may be at least 10%, or 14-25%, or 15-20% (and subsets thereof).

Methods

The following methods are used throughout the instant application for reported values.

Inherent Viscosity (IV) Measurement Method 0.050 g polybenzimidazole is added to a 25 mL volumetric flask. The flask is filled with concentrated sulfuric acid for a final concentration of 0.2 g/dL. The flask is shaken on a mechanical shaker until all polybenzimidazole is dissolved. The polybenzimidazole solution is filtered through a 0.45 μm PTFE syringe filter and added to a 200 μm Ubbelohde viscometer. The viscometer is placed into a 30.0° C. water bath and allowed to equilibrate for 30 minutes. Measurements are recorded until three consecutive times are within 0.1 seconds. The average of these three times is used to calculate the inherent viscosity using the following equation:

$$\eta_{inh} = \frac{\ln(t/t_0)}{C}$$

$\eta_{inh}$ (dL/g): inherent viscosity (IV)
t (sec): solution flow time
$t_0$ (sec): solvent flow time (96% sulfuric acid)
C (g/dL): solution concentration Infrared Spectroscopy Attenuated total reflectance (ATR) spectra were obtained using a Perkin Elmer Spectrum 100 FT-IR with a three reflection diamond/ZnSe crystal. Spectroscopy was performed for the analysis of monomers and dry polymer samples in the range of 4000-650 cm$^{-1}$.

TGA Measurements

Thermogravimetric analysis (TGA) was performed on a TA Instruments Q5000 TGA using 5-10 mg samples heated from 25° C. to 1,000° C. under a nitrogen purge with a heating rate of 5° C./min.

EXAMPLES

In the following examples, when 2 wt % LiCl salt is mentioned, it refers to a premixed solution of DMAc with 2 wt % LiCl was used as the reaction solvent.

Comparative Examples

Low Polymer Solids

Comparative Example 1

1.179 g tetraaminobiphenyl (TAB, 5.5 mmol), 1.883 g isophthalaldehyde bisulfite adduct (IBA, 5.5 mmol) and 80 mL N,N-dimethylacetamide/lithium chloride (2 wt %) (DMAc/LiCl, 2.2% calculated wt % polymer concentration) were added to a three-neck 100 mL round bottom flask. The flask was then equipped with a reflux condenser, stir-rod connected to a mechanical overhead stirrer, and a nitrogen inlet/outlet. The reactant mixture was purged with nitrogen and placed in a silicone oil bath. Oil bath temperature was regulated by a thermal controller with programmable ramp/soak features. The reaction mixture was heated to reflux temperature (approximately 170° C.) and allowed to react for 24 hours. The resulting polymer solution was precipitated in de-ionized (DI) water to isolate the polymer product. The polymer was then dried at 220° C. for 12 hours. Inherent viscosity (IV) measurements were conducted at a concentration of 0.002 g/mL in concentrated sulfuric acid ($H_2SO_4$) and are an average of three measurements. IV=0.28 dL/g.

Comparative Example 2

1.179 g tetraaminobiphenyl (TAB, 5.5 mmol), 1.883 g isophthalaldehyde bisulfite adduct (IBA, 5.5 mmol) and 50 mL N,N-dimethylacetamide/lithium chloride (2 wt %) (DMAc/LiCl, 3.5% calculated wt % polymer concentration) were added to a three-neck 100 mL round bottom flask. The flask was then equipped with a reflux condenser, stir-rod connected to a mechanical overhead stirrer, and a nitrogen inlet/outlet. The reactant mixture was purged with nitrogen and placed in a silicone oil bath. Oil bath temperature was regulated by a thermal controller with programmable ramp/soak features. The reaction mixture was heated to reflux temperature (approximately 170° C.) and allowed to react for 24 hours. The resulting polymer solution was precipitated in de-ionized (DI) water to isolate the polymer product. The polymer was then dried at 220° C. for 12 hours. Inherent viscosity (IV) measurements were conducted at a concentration of 0.002 g/mL in concentrated sulfuric acid ($H_2SO_4$) and are an average of three measurements. IV=0.25 dL/g.

Adduct Preparation Examples

Adduct Example 1

Isophthalaldehyde Bisulfite Adduct Preparation 208.43 g isophthalaldehyde (1.55 moles) and 3475 mL methanol were added to a 5 L round bottom flask. The solution was stirred until all isophthalaldehyde was dissolved. In a separate flask, 332.30 g sodium bisulfite (3.19 moles) and 525 mL water were mixed until all sodium bisulfite was dissolved. The sodium bisulfite solution was added dropwise over two hours to the isophthalaldehyde-methanol solution while stirring. After stirring for 24 hours, the isophthalaldehyde bisulfite adduct was filtered, washed with 2 L methanol, then dried at 60° C. in a vacuum oven. NMR confirmed the isophthalaldehyde bisulfite adduct was formed. Yields of several runs: 96-98%.

Adduct Example 2

Terephthaldehyde Bisulfite Adduct Preparation 10.00 g terephthalaldehyde (TPA, 74.6 mmol) and 350 ml methanol were added to a 500 ml round bottom flask, then mixed with an overhead stirrer. 15.54 g sodium bisulfite (NaBS, 149.2 mmol) was weighed out and dissolved in 24 ml deionized water in a separate flask. The TPA mixture was heated to 35° C. for 30 minutes to aid in dissolution, then cooled to 30° C. before the dropwise addition of the NaBS solution via an addition funnel. As the TPA adduct formed it precipitated from solution. The reaction was allowed to stir overnight before filtering the product. The TPA adduct was washed twice with 100 ml methanol before drying in a vacuum oven overnight at 60° C. Yield: 24.05 g (94.8%).

Inventive Examples

High Polymer Solids

Inventive Example 1

2.504 g tetraaminobiphenyl (TAB, 11.7 mmol), 4.002 g isophthalaldehyde bisulfite adduct (IBA, 11.7 mmol) and 23 mL N,N-dimethylacetamide/lithium chloride (2 wt %) (DMAc/LiCl, 14.3% calculated wt % polymer concentration) were added to a three-neck 100 mL round bottom flask. The flask was then equipped with a reflux condenser, stir-rod connected to a mechanical overhead stirrer, and a nitrogen inlet/outlet. The reactant mixture was purged with nitrogen and placed in a silicone oil bath. Oil bath temperature was regulated by a thermal controller with programmable ramp/soak features. The reaction mixture was heated to reflux temperature (approximately 170° C.) and allowed to react for 24 hours. The resulting polymer solution was precipitated in de-ionized (DI) water to isolate the polymer product. The polymer was then dried at 220° C. for 12 hours. Inherent viscosity (IV) measurements were conducted at a concentration of 0.002 g/mL in concentrated sulfuric acid ($H_2SO_4$) and are an average of three measurements. IV=0.73 dL/g. IR spectrum was recorded and appeared identical to the spectrum recorded from a commercial PBI sample.

Inventive Example 2

2.504 g tetraaminobiphenyl (TAB, 11.7 mmol), 4 g isophthalaldehyde bisulfite adduct (IBA, 11.7 mmol) and 17.4 mL N,N-dimethylacetamide/lithium chloride (2 wt %) (DMAc/LiCl, 18.1% calculated wt % polymer concentration) were added to a three-neck 100 mL round bottom flask. The flask was then equipped with a reflux condenser, stir-rod connected to a mechanical overhead stirrer, and a nitrogen inlet/outlet. The reactant mixture was purged with nitrogen and placed in a silicone oil bath. Oil bath temperature was regulated by a thermal controller with programmable ramp/soak features. The reaction mixture was heated to reflux temperature (approximately 170° C.) and allowed to react for 24 hours. The resulting polymer solution was precipitated in de-ionized (DI) water to isolate the polymer product. The polymer was then dried at 220° C. for 12 hours. Inherent viscosity (IV) measurements were conducted at a concentration of 0.002 g/mL in concentrated sulfuric acid ($H_2SO_4$)

and are an average of three measurements. IV=0.96 dL/g. IR and NMR spectra were recorded and appeared identical to the spectra recorded from a commercial PBI sample.

Inventive Example 3

2.504 g tetraaminobiphenyl (TAB, 11.7 mmol), 4 g isophthalaldehyde bisulfite adduct (IBA, 11.7 mmol) and 10.45 mL N,N-dimethylacetamide/lithium chloride (2 wt %) (DMAc/LiCl, 26.9% calculated wt % polymer concentration) were added to a three-neck 100 mL round bottom flask. The flask was then equipped with a reflux condenser, stir-rod connected to a mechanical overhead stirrer, and a nitrogen inlet/outlet. The reactant mixture was purged with nitrogen and placed in a silicone oil bath. Oil bath temperature was regulated by a thermal controller with programmable ramp/soak features. The reaction mixture was heated to reflux temperature (approximately 170° C.) and allowed to react for 16 hours. The resulting polymer solution solidified. The polymer was crushed and washed in de-ionized (DI) water and was then dried at 220° C. for 12 hours. Inherent viscosity (IV) measurements were conducted at a concentration of 0.002 g/mL in concentrated sulfuric acid ($H_2SO_4$) and are an average of three measurements. IV=0.78 dL/g.

Inventive Example 4

2.504 g tetraaminobiphenyl (TAB, 11.7 mmol), 4 g isophthalaldehyde bisulfite adduct (IBA, 11.7 mmol) and 17.8 mL N,N-dimethylacetamide (DMAc, 17.8% calculated wt % polymer concentration) were added to a three-neck 100 mL round bottom flask. The flask was then equipped with a reflux condenser, stir-rod connected to a mechanical overhead stirrer, and a nitrogen inlet/outlet. The reactant mixture was purged with nitrogen and placed in a silicone oil bath. Oil bath temperature was regulated by a thermal controller with programmable ramp/soak features. The reaction mixture was heated to reflux temperature (approximately 170° C.) and allowed to react for 24 hours. The resulting polymer solution was precipitated in de-ionized (DI) water to isolate the polymer product. The polymer was then dried at 220° C. for 12 hours. Inherent viscosity (IV) measurements were conducted at a concentration of 0.002 g/mL in concentrated sulfuric acid ($H_2SO_4$) and are an average of three measurements. IV=0.55 dL/g.

Inventive Example 5

2.504 g tetraaminobiphenyl (TAB, 11.7 mmol), 4 g isophthalaldehyde bisulfite adduct (IBA, 11.7 mmol) and 16.2 mL N,N-dimethylacetamide (DMAc, 19.2% calculated wt % polymer concentration) were added to a three-neck 100 mL round bottom flask. The flask was then equipped with a reflux condenser, stir-rod connected to a mechanical overhead stirrer, and a nitrogen inlet/outlet. The reactant mixture was purged with nitrogen and placed in a silicone oil bath. Oil bath temperature was regulated by a thermal controller with programmable ramp/soak features. The reaction mixture was heated to reflux temperature (approximately 170° C.) and allowed to react for 24 hours. The resulting polymer solution was precipitated in de-ionized (DI) water to isolate the polymer product. The polymer was washed with methanol (MeOH) using a Soxhlet extractor for 24 hours. The product was then dried at 60° C. for 12 hours. Inherent viscosity (IV) measurements were conducted at a concentration of 0.002 g/mL in concentrated sulfuric acid ($H_2SO_4$) and are an average of three measurements. IV=1.03 dL/g.

Inventive Example 6

2.504 g tetraaminobiphenyl (TAB, 11.7 mmol), 4.006 g isophthalaldehyde bisulfite adduct (IBA, 11.7 mmol) and 17.5 mL N,N-dimethylacetamide (DMAc, 18.0% calculated wt % polymer concentration) were added to a three-neck 100 mL round bottom flask. The flask was then equipped with a reflux condenser, stir-rod connected to a mechanical overhead stirrer, and a nitrogen inlet/outlet. The reactant mixture was purged with nitrogen and placed in a silicone oil bath. Oil bath temperature was regulated by a thermal controller with programmable ramp/soak features. The reaction mixture was heated to reflux temperature (approximately 170° C.) and allowed to react for 24 hours. The resulting polymer solution was precipitated in de-ionized (DI) water to isolate the polymer product. The polymer was then dried at 220° C. for 12 hours. Inherent viscosity (IV) measurements were conducted at a concentration of 0.002 g/mL in concentrated sulfuric acid ($H_2SO_4$) and are an average of three measurements. IV=0.79 dL/g.

Inventive Example 7

2.184 g tetraaminobiphenyl (TAB, 10.2 mmol), 3.488 g isophthalaldehyde bisulfite adduct (IBA, 10.1 mmol) and 9.9 mL N,N-dimethylacetamide (DMAc, 25.1% calculated wt % polymer concentration) were added to a three-neck 100 mL round bottom flask. The flask was then equipped with a reflux condenser, stir-rod connected to a mechanical overhead stirrer, and a nitrogen inlet/outlet. The reactant mixture was purged with nitrogen and placed in a silicone oil bath. Oil bath temperature was regulated by a thermal controller with programmable ramp/soak features. The reaction mixture was heated to reflux temperature (approximately 170° C.) and allowed to react for 24 hours. The resulting polymer solution was precipitated in de-ionized (DI) water to isolate the polymer product. The polymer was then dried at 220° C. for 12 hours. Inherent viscosity (IV) measurements were conducted at a concentration of 0.002 g/mL in concentrated sulfuric acid ($H_2SO_4$) and are an average of three measurements. IV=0.45 dL/g.

Inventive Example 8

2.504 g tetraaminobiphenyl (TAB, 11.7 mmol), 4 g isophthalaldehyde bisulfite adduct (IBA, 11.7 mmol) and 17.8 mL N,N-dimethylacetamide (DMAc, 17.8% calculated wt % polymer concentration) were added to a three-neck 100 mL round bottom flask. The flask was then equipped with a reflux condenser, stir-rod connected to a mechanical overhead stirrer, and a nitrogen inlet/outlet. The reactant mixture was purged with nitrogen and placed in a silicone oil bath. Oil bath temperature was regulated by a thermal controller with programmable ramp/soak features. The reaction mixture was heated to reflux temperature (approximately 170° C.) and allowed to react for 18 hours. The resulting polymer solution was precipitated in de-ionized (DI) water to isolate the polymer product. The polymer was then dried at 220° C. for 12 hours. Inherent viscosity (IV) measurements were conducted at a concentration of 0.002 g/mL in concentrated sulfuric acid ($H_2SO_4$) and are an average of three measurements. IV=0.6 dL/g.

Inventive Example 9

With Pre-Dissolved TAB Monomer 2.504 g tetraaminobiphenyl (TAB, 11.7 mmol) and 17.8 mL of DMAc were added to a 25 mL volumetric flask. The flask was placed on a mechanical shaker until TAB monomer fully dissolved. Once dissolved, 3 hours were allowed to pass to evaluate the solution stability. After 3 hours, the premixed solution and 4 g isophthalaldehyde bisulfite adduct (IBA, 11.7 mmol) were added to a three-neck 100 mL round bottom flask. The flask was then equipped with a reflux condenser, stir-rod connected to a mechanical overhead stirrer, and a nitrogen inlet/outlet. The reactant mixture was purged with nitrogen and placed in a silicone oil bath. Oil bath temperature was regulated by a thermal controller with programmable ramp/soak features. The reaction mixture was heated to reflux temperature (approximately 170° C.) and allowed to react for 24 hours. The resulting polymer solution was precipitated in de-ionized (DI) water to isolate the polymer product. The polymer was then dried at 220° C. for 12 hours. Inherent viscosity (IV) measurements were conducted at a concentration of 0.002 g/mL in concentrated sulfuric acid ($H_2SO_4$) and are an average of three measurements. IV=0.90 dL/g.

Inventive Example 10

With Post Polymerization $NaHSO_3$ Addition for Solution Viscosity Modification 105.168 g tetraaminobiphenyl (TAB, 0.477 mol), 163 g isophthalaldehyde bisulfite adduct (IBA, 0.477 mol) and 706 mL dimethylacetamide (DMAc, 18.1% polymer solution) were added to a 1 L three-neck reactor kettle. The kettle was then equipped with a reflux condenser, stir-rod connected to a mechanical overhead stirrer, and a nitrogen inlet/outlet. The reactant mixture was purged with nitrogen and placed in a silicone oil bath. Oil bath temperature was regulated by a thermal controller with programmable ramp/soak features. The reaction mixture was heated to reflux temperature (approximately 170° C.) and allowed to react for 24 hours. An aliquot of the resulting polymer solution was precipitated in de-ionized (DI) water to isolate the polymer product. The polymer was then dried at 220° C. for 12 hours. Inherent viscosity (IV) measurements were conducted at a concentration of 0.002 g/mL in concentrated sulfuric acid ($H_2SO_4$) and are an average of three measurements. IV=0.32 dL/g.

25.2 g of the polymer solution and 0.514 g $NaHSO_3$ were added to a three-neck reactor kettle. The reactor kettle was then equipped with a stir shaft, and nitrogen inlet/outlet. The reaction kettle was purged with nitrogen, then heated to 140° C. and stirred at 40 RPM for 24 hours. IV=0.4 dL/g. Solution Viscosity=3004.648 Poise

Inventive Example 11

With 2 wt % $NaHSO_3$ Added to Reaction Mixture Prior to Polymerization (2 wt % $NaHSO_3$ of Total Solution and Reactant Weights)

25.04 g tetraaminobiphenyl (TAB, 0.117 mol), 40 g isophthalaldehyde bisulfite adduct (IBA, 0.117 mol), 4.58 g sodium bisulfite ($NaHSO_3$, 44 mmol) and 175 mL N,N-dimethylacetamide (DMAc, 18.0% calculated wt % polymer concentration) were added to a 250 mL three-neck round bottom flask. The flask was then equipped with a reflux condenser, stir-rod connected to a mechanical overhead stirrer, and a nitrogen inlet/outlet. The reactant mixture was purged with nitrogen and placed in a silicone oil bath. Oil bath temperature was regulated by a thermal controller with programmable ramp/soak features. The reaction mixture was heated to reflux temperature (approximately 170° C.) and allowed to react for 24 hours. An aliquot of the resulting polymer solution was precipitated in de-ionized (DI) water to isolate the polymer product. The polymer was then dried at 220° C. for 12 hours. Inherent viscosity (IV) measurements were conducted at a concentration of 0.002 g/mL in concentrated sulfuric acid ($H_2SO_4$) and are an average of three measurements. IV=0.624 dL/g.

Inventive Example 12

2.504 g tetraaminobiphenyl (TAB, 11.7 mmol), 4.00 g isophthalaldehyde bisulfite adduct (IBA, 11.8 mmol), and 17.5 ml N,N-dimethylacetamide (DMAc, 18.0 calculated wt % polymer concentration) were added to a 100 ml resin kettle, mixed with an overhead stirrer, purged with dry nitrogen. The mixture was heated to 140° C. for 24 hours. The inherent viscosity (IV) was 0.82 dL/g, as determined from a 0.002 g/mL solution of polymer in concentrated $H_2SO_4$ at 30° C. Thermogravimetric analysis showed that the thermal stability of the polymer as measured by the 5% weight loss of the original sample weight (after water removal) was greater than 550° C. The IR spectrum was recorded and appeared identical to the spectrum recorded from a commercial PBI sample.

Inventive Example 13

22% Solids Polymerization with 2% Molar Excess $NaHSO_3$ 43.70 g isophthalaldehyde bisulfite adduct (IBA, 0.1277 moles), 27.36 g tetraaminobiphenyl (TAB, 0.1277 moles), 0.267 g sodium bisulfite ($NaHSO_3$, 0.0025 moles), and 150 mL N,N-dimethylacetamide (DMAc, 21.9% calculated wt % polymer concentration) was added to a 300 mL three-neck round bottom flask. The flask was fitted with a reflux condenser, overhead stirrer, and purged with dry nitrogen. The solution was heated to reflux temperature (168° C.) and stirred at 30 RPM for 24 hours. Inherent viscosity of the polymer is 0.64 dL/g, as measured using a 0.002 g/mL solution of polymer in concentrated sulfuric acid. The FTIR spectrum of the polymer appeared identical to the spectrum of a commercial PBI sample.

Inventive Example 14

22% Solids Polymerization with 4% Molar Excess $NaHSO_3$ 43.70 g isophthalaldehyde bisulfite adduct (IBA, 0.1277 moles), 27.36 g tetraaminobiphenyl (TAB, 0.1277 moles), 0.534 g sodium bisulfite ($NaHSO_3$, 0.0051 moles), and 150 mL N,N-dimethylacetamide (DMAc, 21.8% calculated wt % polymer concentration) was added to a 300 mL three-neck round bottom flask. The flask was fitted with a reflux condenser, overhead stirrer, and purged with dry nitrogen. The solution was heated to reflux temperature (168° C.) and stirred at 30 RPM for 24 hours. Inherent viscosity of the polymer was 0.75 dL/g, as measured using a 0.002 g/mL solution of polymer in concentrated sulfuric acid. The FTIR spectrum of polymer appeared identical to the spectrum of a commercial PBI sample.

Inventive Example 15

Copolymer, meta-r-para-PBI 1:1

2.504 g tetraaminobiphenyl (TAB, 11.7 mmol), 2.00 g isophthalaldehyde bisulfite adduct (IBA, 5.9 mmol), 2.00 g terephthalaldehyde bisulfite adduct (IBA, 5.9 mmol), and 17.5 ml N,N-dimethylacetamide (DMAc, 18.0% calculated wt % polymer concentration) were added to a 100 ml resin kettle, mixed with an overhead stirrer, and purged with dry nitrogen. The mixture was heated to reflux for 24 hours. The inherent viscosity (IV) was 0.495 dL/g, as determined from a 0.002 g/mL solution of polymer in concentrated $H_2SO_4$ at 30° C.

Inventive Example 16

Homopolymer of para-PBI 2.504 g tetraaminobiphenyl (TAB, 11.7 mmol), 4.00 g terephthalaldehyde bisulfite adduct (IBA, 11.8 mmol), and 22.5 ml N,N-dimethylacetamide (DMAc, 14.6% calculated wt % polymer concentration) were added to a 100 ml resin kettle, mixed with an overhead stirrer, and purged with dry nitrogen. The mixture was heated to reflux for 24 hours. The inherent viscosity (IV) was 0.555 dL/g, as determined from a 0.002 g/mL solution of the polymer in concentrated $H_2SO_4$ at 30° C.

The present invention may be embodied in other forms without departing from the spirit and the essential attributes thereof, and, accordingly, reference should be made to the appended claims, rather than to the foregoing specification, as indicated the scope of the invention.

We claim:

1. A method of making a polybenzimidazole fiber or film comprising the steps of:
    reacting, in a solution,
        an organic compound having at least 4 amino groups with
        an organic dialdehyde bis(bisulfite) adduct,
    the reactants comprise at least 8% by weight of the solution,
        forming a polybenzimidazole polymer with an intrinsic viscosity (IV) in concentrated sulfuric acid of at least 0.50 dl/g, and
        forming the polybenzimidazole polymer into the fiber or film.

2. The method of claim 1 where a solvent of the solution being selected from the group consisting of: N, N-dimethylacetamide (DMAc), N, N-dimethylformamide (DMF), dimethylsulfoxide (DMSO), N-methyl-2-pyrrolidone (NMP), tetramethylene sulfone, and combinations thereof.

3. The method of claim 1 wherein the bis(bisulfite) portion of the organic aldehyde bisulfite adduct being selected from the group consisting of sodium bisulfite, potassium bisulfite, sodium metabisulfite, potassium metabisulfite, ammonium sulfite, and ammonium metabisulfite.

4. The method of claim 1 wherein the organic aldehyde portion of the organic aldehyde adduct being aliphatic, alicyclic, aromatic, or heterocyclic dialdehyde and mixtures thereof.

5. The method of claim 1 wherein the organic compound being an organic tetraamine.

6. The method of claim 1 wherein for fiber spinning, the solution having a weight % solids of the solution of at least 15%.

* * * * *